(12) United States Patent
Federspiel

(10) Patent No.: US 6,719,625 B2
(45) Date of Patent: Apr. 13, 2004

(54) METHOD AND APPARATUS FOR CONTROLLING VARIABLE AIR VOLUME SUPPLY FANS IN HEATING, VENTILATING, AND AIR-CONDITIONING SYSTEMS

(76) Inventor: Clifford Conrad Federspiel, 1764 Wesley Ave., El Cerrito, CA (US) 94530

(*) Notice: Subject to any disclaimer, the term of this patent is extended or adjusted under 35 U.S.C. 154(b) by 0 days.

(21) Appl. No.: 10/252,278

(22) Filed: Sep. 23, 2002

(65) Prior Publication Data

US 2003/0064676 A1 Apr. 3, 2003

Related U.S. Application Data

(60) Provisional application No. 60/325,070, filed on Sep. 26, 2001.

(51) Int. Cl.⁷ ................................................ F24F 3/048
(52) U.S. Cl. ....................................... 454/256; 165/217
(58) Field of Search .................... 454/256; 165/217; 236/49.3

(56) References Cited

U.S. PATENT DOCUMENTS

| | | | |
|---|---|---|---|
| 4,437,608 A | | 3/1984 | Smith |
| 4,533,080 A | * | 8/1985 | Clark et al. ............... 236/49.3 |
| 4,630,670 A | | 12/1986 | Wellman et al. |
| 4,635,445 A | * | 1/1987 | Otsuka et al. .............. 62/158 |
| 4,705,457 A | * | 11/1987 | Belusa ....................... 417/22 |
| 4,836,095 A | | 6/1989 | Wright |
| 4,948,040 A | * | 8/1990 | Kobayashi et al. ........ 236/49.3 |
| 5,540,619 A | | 7/1996 | Ahmed |
| 5,573,181 A | | 11/1996 | Ahmed |
| 5,605,280 A | * | 2/1997 | Hartman .................... 236/49.3 |
| 5,863,246 A | | 1/1999 | Bujak |
| 6,227,961 B1 | | 5/2001 | Moore |

* cited by examiner

Primary Examiner—Harold Joyce

(57) ABSTRACT

A control strategy for supply fans in variable-air-volume heating, ventilating, and air-conditioning systems that reduces the static pressure at part-load conditions. The invention consists of a static pressure sensor, an airflow sensor, a supply fan, a fan modulating device, and a controller coupled to the static pressure sensor and the airflow sensor. The controller includes a calculator that calculates the static pressure setpoint as a function of the airflow rate. The static pressure setpoint is lower when the airflow rate is lower. The controller compares the static pressure setpoint with the static pressure, and it commands the fan modulating device so that the static pressure remains close to the static pressure setpoint. Alternatively, the controller includes a calculator that calculates a loss coefficient as a function of the static pressure and the supply rate. The controller compares the loss coefficient with a loss coefficient setpoint, and it commands the fan modulating device so that the loss coefficient remains close to the loss coefficient setpoint. When the airflow rate is sufficiently high, the alternative embodiment switches to a constant-pressure controller.

16 Claims, 5 Drawing Sheets

METHOD AND APPARATUS FOR CONTROLLING VARIABLE AIR VOLUME SUPPLY FANS IN HEATING, VENTILATING, AND AIR-CONDITIONING SYSTEMS

CROSS-REFERENCE TO RELATED APPLICATIONS

This application claims benefit under Title 35, United States Code §119(e) of U.S. Provisional Application No. 60/325,070 filed on Sep. 26, 2001.

BACKGROUND

1. Field of the Invention

The following invention relates to controls for variable-air-volume (VAV) heating, ventilating, and air-conditioning (HVAC) systems, specifically to control of a supply fan in VAV HVAC systems.

2. Description of the Prior Art

Modern buildings typically have complex heating, ventilating, and air-conditioning systems to control indoor temperature, pressure, ventilation rate, and other variables in a way that makes efficient use of energy. One way to conserve energy in these systems is to use a so-called variable-air-volume design. Key components of a variable-air-volume system are a supply fan and terminal units. The supply fan is a prime mover that causes air to move. A terminal unit contains a throttling damper that regulates an amount of air supplied to a space in a building that it controls in order to regulate temperature and ventilation in that space.

In a variable-air-volume system, the flow rate of conditioned air supplied to a building is adjusted so that no more air than necessary is used. Variable flow is achieved using controls on or near the supply fan and by the use of controls on the terminals. The supply fan controls adjust the speed of the fan, an angle of the fan blades, an angle of guide vane at an inlet or outlet of the fan, or by adjusting a damper upstream or downstream of the fan that throttles the flow. The controls on the terminals determine how much air flows through each terminal.

The most common control strategy for the supply fan of variable-air-volume systems is to regulate a static pressure in a supply duct at a point downstream of the supply fan. This strategy seeks to keep the static pressure at a measurement point constant at all times. Control strategies based on a constant static pressure in the supply duct have been proposed in U.S. Pat. No. 4,437,608 to Smith (1984) and U.S. Pat. No. 6,227,961 to Moore et al. (2001). U.S. Pat. No. 4,836,095 to Wright (1989) describes a variant of this strategy for systems that have multi-speed fans rather than fans in which the speed is continuously variable. A rule of thumb for this strategy is to locate the pressure sensor two-thirds of the distance from the supply fan to the end of the supply duct. A problem with this strategy is that it is inefficient at part-load conditions, when the supply flow rate is significantly lower than a design flow rate, which is the flow rate at which the system should operate when the fan is running at full speed.

A control strategy that overcomes the problem of constant static pressure control is one in which a static pressure setpoint is reset based on a position of a terminal damper that is most open. Control strategies that reset the static pressure based on the position of the terminal damper that is most open have been proposed in U.S. Pat. No. 4,630,670 to Wellman and Clark (1986) and U.S. Pat. No. 5,863,246 to Bujak (1999). An objective is to keep this damper nearly open or completely open. Doing so reduces throttling losses at part-load conditions.

One problem with resetting static pressure based on the position of the most-open terminal damper is that it requires that the control system be able to measure the position of every terminal damper. Large systems could have hundreds of terminal dampers. Requiring terminal damper position measurement adds cost to the HVAC system.

Another problem with resetting static pressure based on the position of the most-open terminal damper is that it is sensitive to a communications failure. The terminal dampers are usually located far from the supply fan, so a digital communication network is used to connect the terminal unit control device, which knows the terminal damper position, with the supply fan control device. A failure in the network connecting these devices will cause the control strategy to fail.

Yet another problem with resetting static pressure based on the position of the most-open terminal damper is that it is sensitive to a terminal unit failure. If even one of the terminal units is not working properly the resetting strategy will not work properly.

Still another problem with resetting static pressure based on the position of the most-open terminal damper is that it is sensitive to a design flaw in which one or more terminal dampers is undersized. In this case the undersized terminal damper will require high pressure to achieve its required flow, causing large throttling losses at the terminal dampers that are not undersized.

A final problem with resetting static pressure based on the position of the most-open terminal damper is that it is difficult to tune. The most efficient operating point is when the most-open damper is completely open. If the strategy tries to keep the most-open damper completely open then the strategy cannot determine if the supply duct pressure is too low. If the controller tries to keep the most-open damper nearly completely open, then when it becomes completely open due to a disturbance in the system, the strategy cannot determine if the pressure is just slightly too low or far too low.

Several variants of static pressure resetting have been used. For example, one strategy resets the static pressure based on an average position of a set of terminal dampers that are most open. The averaging feature allows this strategy to reduce the energy consumption at part load conditions even if a small number of terminal units fail or are undersized. However, the strategy is still limited by the need for terminal damper position sensing, is still sensitive to network failure, and is still difficult to tune.

More complex strategies for controlling supply fans have been proposed in U.S. Pat. Nos. 5,540,619 and 5,573,181, both to Ahmed (1996). These inventions require the measurement of flow or pressure in all branches downstream of the supply fan in addition to measurement of the position of each terminal damper. Consequently, they have all the problems of the static pressure resetting inventions described above.

Accordingly, a need exists for a supply fan control strategy that can improve the part-load efficiency of supply fans in variable-air-volume systems without requiring the added cost of position measurements, without being sensitive to communications system failure, and being easy to tune.

SUMMARY OF THE INVENTION

In accordance with the present invention, a control strategy for a supply fan of a variable-air-volume heating, ventilating, and air-conditioning system comprises the supply fan, a fan modulating device, a static pressure sensor, an airflow sensor, and a controller coupled to the static pressure sensor, the airflow sensor, and the fan modulating device. The controller causes static pressure downstream of the fan to be reduced below a design static pressure when the airflow rate is below a design airflow rate.

The preferred method of reducing the pressure is to use a setpoint calculator that determines a static pressure setpoint as a function of the airflow rate. The relationship between the airflow rate and the setpoint could be linear, a polynomial function, or a relationship defined by a lookup table.

An alternative method of reducing the pressure is to calculate a loss coefficient that is the static pressure divided by a sum of a constant and the airflow rate raised to an exponent. The purpose of the constant is to ensure that the controller causes the fan to develop pressure at start-up, when the airflow rate is zero. The exponent should be preferably between 1.0 and 2.0. To limit the static pressure, a constant pressure mode is used in conjunction with the loss coefficient control mode. When the airflow rate becomes greater than the design airflow rate, the controller switches to the constant pressure mode, and the controller causes the pressure to be regulated to the design static pressure.

OBJECTS OF THE INVENTION

Accordingly, a primary object of the present invention is to provide a control strategy for supply fans of variable-air-volume heating, ventilating, and air-conditioning systems that can improve the energy efficiency at part-load conditions without requiring that the positions of terminal dampers be measured.

Another object of the present invention is provide a control strategy for supply fans of variable-air-volume heating, ventilating, and air-conditioning systems that can improve the energy efficiency at part-load conditions without being sensitive to a communication system failure.

Another object of the present invention is provide a control strategy for supply fans of variable-air-volume heating, ventilating, and air-conditioning systems that can improve the energy efficiency at part-load conditions without being sensitive to a failure of a terminal unit.

Another object of the present invention is provide a control strategy for supply fans of variable-air-volume heating, ventilating, and air-conditioning systems that can improve the energy efficiency at part-load conditions without being sensitive to a design flaw in which one or more terminal units is undersized.

Another object of the present invention is provide a control strategy for supply fans of variable-air-volume heating, ventilating, and air-conditioning systems that can improve the energy efficiency at part-load conditions and is easy to tune.

Other further objects of the present invention will become apparent from a careful reading of the included drawing figures, the claims, and detailed description of the invention.

REFERENCE NUMERALS IN DRAWINGS

| | |
|---|---|
| 11 supply fan | 12 fan modulating device |
| 13 supply duct | 14 terminal duct |
| 15 terminal unit | 16 terminal unit controller |
| 17 static pressure sensor | 18 airflow sensor |
| 19 supply fan controller | 20 terminal damper |
| 21 PID calculator | 22 setpoint calculator |
| 23 offset | 24 loss coefficient control mode |
| 25 constant pressure control mode | 26 loss coefficient calculator |
| 27 loss coefficient setpoint | |

DESCRIPTION OF THE PREFERRED EMBODIMENT

Figure 1:
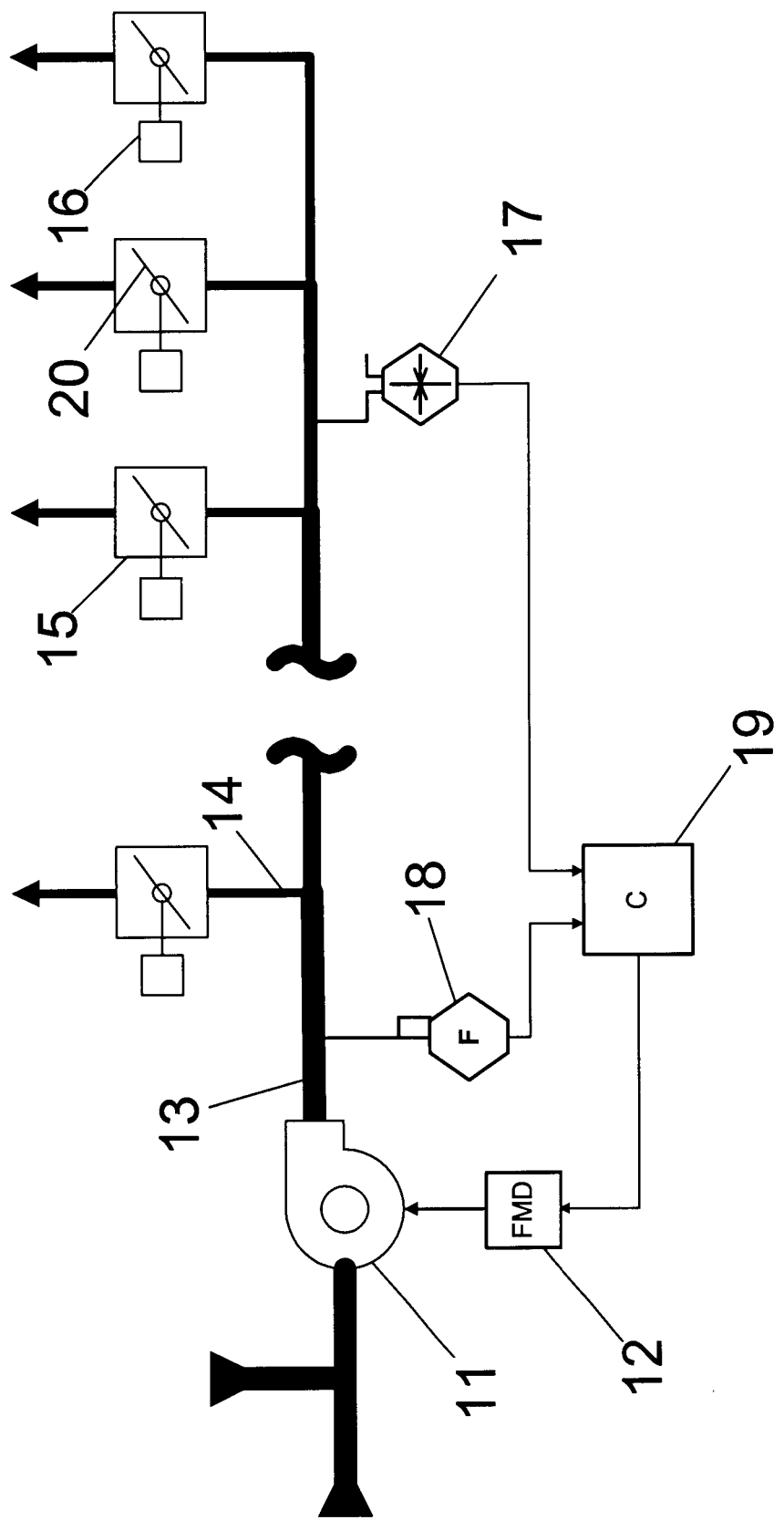
FIG. 1 is a schematic diagram of a portion of a variable-air-volume (VAV) heating, ventilating, and air-conditioning (HVAC) system.
Figure 2:
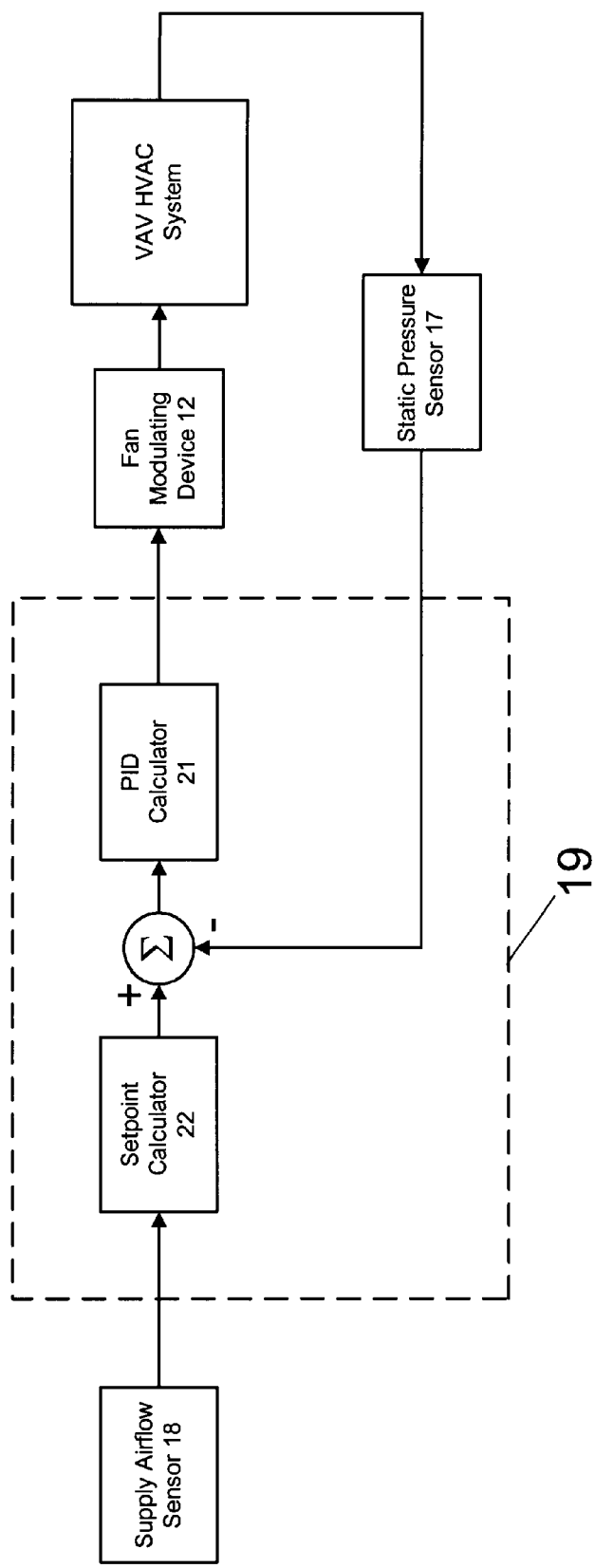
FIG. 2 is a block diagram of a control strategy that resets the static pressure setpoint of a variable-air-volume static pressure control loop as a function of the airflow rate.
Figure 3:
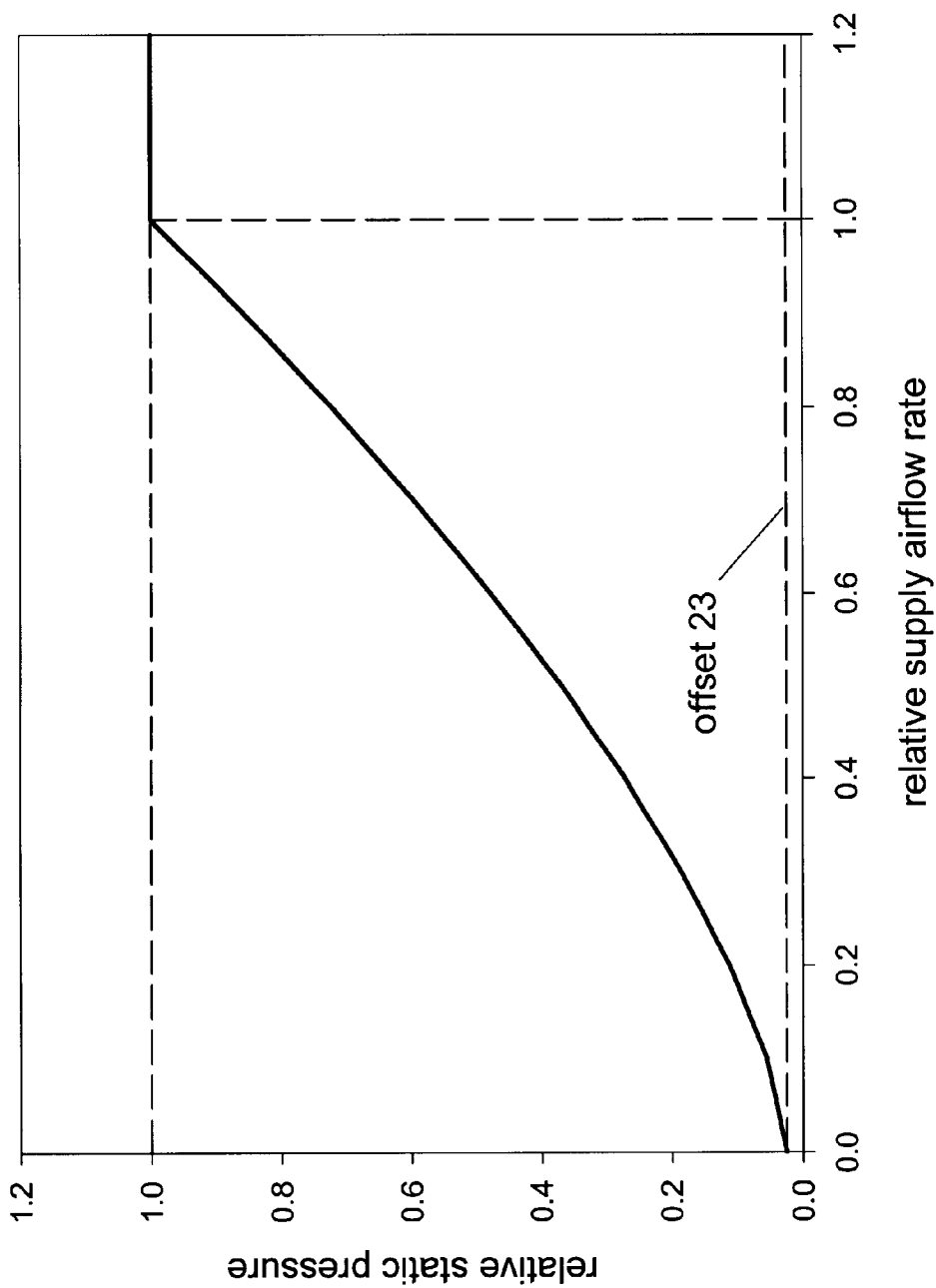
FIG. 3 shows a relationship between the output of an airflow sensor and the output of a setpoint calculation.

A preferred embodiment of the supply fan control system is shown in FIG. 1, FIG. 2, and FIG. 3. Components of such a system that are relevant to the supply fan control system include the supply fan 11, a fan modulating device 12, a supply duct 13, two or more terminal ducts 14, two or more terminal units 15, two or more terminal unit controllers 16, a static pressure sensor 17, an airflow sensor 18, and a supply fan controller 19. The system also contains other components such as heat exchangers and filters not shown in FIG. 1, which are used for other functions such as heating, cooling, and cleaning air. The supply fan 11 could be a centrifugal fan or an axial fan. The fan modulating device 12 could be a variable-speed drive, variable inlet guide vanes, a throttling device such as a damper, or a device to adjust the pitch of the fan blades. The supply duct 13 is an elongate sheet metal structure with rectangular cross-section used to transport air. Each terminal duct 14 is also an elongate sheet metal structure used to transport air. Each terminal duct 14 contains the terminal unit 15, which contains at least one control damper 20 used to regulate a flow rate of air in the terminal duct 14 in response to commands from the terminal unit controller 16. The static pressure sensor 17 is located downstream of the supply fan 11. The static pressure sensor indicates the static pressure in the supply duct 13. The airflow sensor 18 indicates a flow rate of air in the supply duct 13. The airflow sensor 18 may be located either upstream or downstream of the supply fan 11. The supply fan controller 19 may be an electronic device with a microprocessor and memory, an analog electrical circuit, or a pneumatic device.

A signal from the static pressure sensor 17 and the airflow sensor 18 are inputs to the supply fan controller 19. The output of the supply fan controller 19 is the input to the fan modulating device 12. As shown in FIG. 2, the output of the supply fan controller 19 is adjusted by a proportional-integral-derivative (PID) calculator 21 to maintain the output of the static pressure 17 close to an output of a setpoint calculator 22. The output of the airflow sensor 18 is an input to the setpoint calculator 22.

FIG. 3 shows a relationship between the output of the airflow sensor 18 and the output of the setpoint calculation 22. The values on the vertical axis of FIG. 3 are divided by a design static pressure, which may differ from one system to another. A typical value of the design static pressure is 1.5 inches water column. The values on the vertical axis of FIG.

3 are divided by a design airflow rate. The design airflow rate differs from one system to another. It is typically 1.2 cubic feet per minute (CFM) times the number of square feet of floor space served by the HVAC system. A relative airflow reading is the output of the airflow sensor divided by the design airflow rate. A relative setpoint is the output of the setpoint calculation divided by the design static pressure. An offset 23 that is preferably greater than zero ensures that the fan will develop pressure and flow when the system is first turned on. Between a flow rate of zero and the design airflow rate, the relationship between the setpoint and the airflow rate may be nonlinear. The nonlinear relationship may be in the form of a polynomial function or a lookup table. When the airflow reading exceeds the design airflow rate the setpoint is constant.

Operation of the Preferred Embodiment

In operation, the supply fan control system reduces the static pressure indicated by the static pressure sensor 17 below the design static pressure when the airflow rate indicated by the airflow sensor 18 is lower than the design airflow rate. When the system is first turned on, the airflow is zero and the static pressure setpoint computed by the setpoint calculator 22 is equal to the offset. The fan accelerates the air and increases the flow rate, which increases the setpoint. Eventually the terminal unit controllers 16 adjust the terminal unit dampers 20 to achieve desired terminal airflow rates. When this happens, the supply airflow rate indicated by the airflow sensor 18 stabilizes, which causes the static pressure setpoint computed by the setpoint calculator 22 and the static pressure indicated by the static pressure sensor 17 to stabilize. If one or more terminal unit controller 16 causes the airflow rate indicated by the airflow sensor 18 to decrease, then the static pressure setpoint computed by the setpoint calculator 22 will decrease. If one or more terminal controller 6 causes the airflow rate indicated by the airflow sensor 18 to increase, then the static pressure setpoint computed by the setpoint calculator 22 will increase. If the operation of the terminal unit controllers 16 causes the airflow rate indicated by the airflow sensor 18 to increase beyond the design airflow rate, then the static pressure calculator will compute a static pressure setpoint that is equal to the design static pressure.

Description of an Alternative Embodiment

Figure 4:
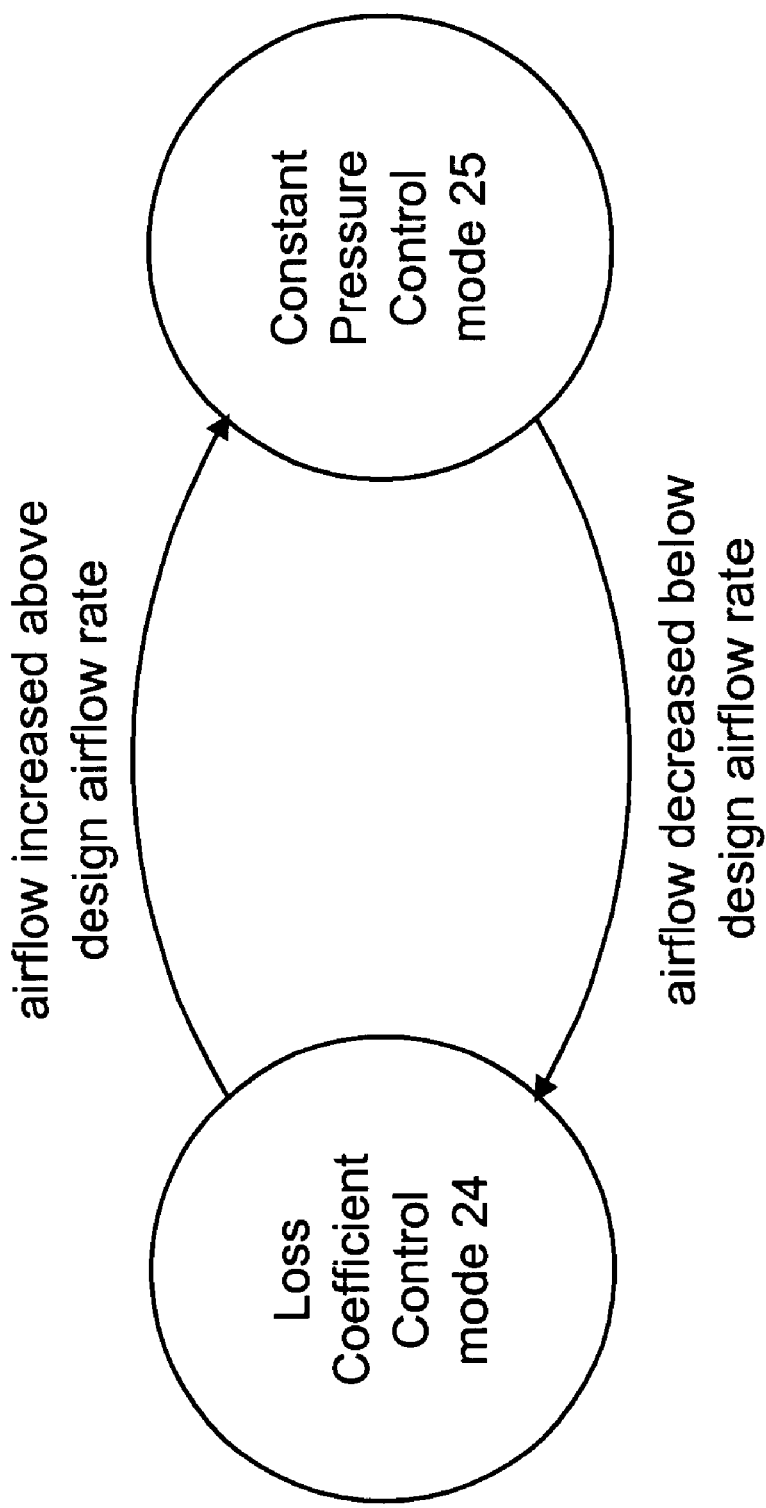
FIG. 4 shows a state transition diagram of an alternative embodiment for controlling a supply fan of a VAV HVAC system.
Figure 5:
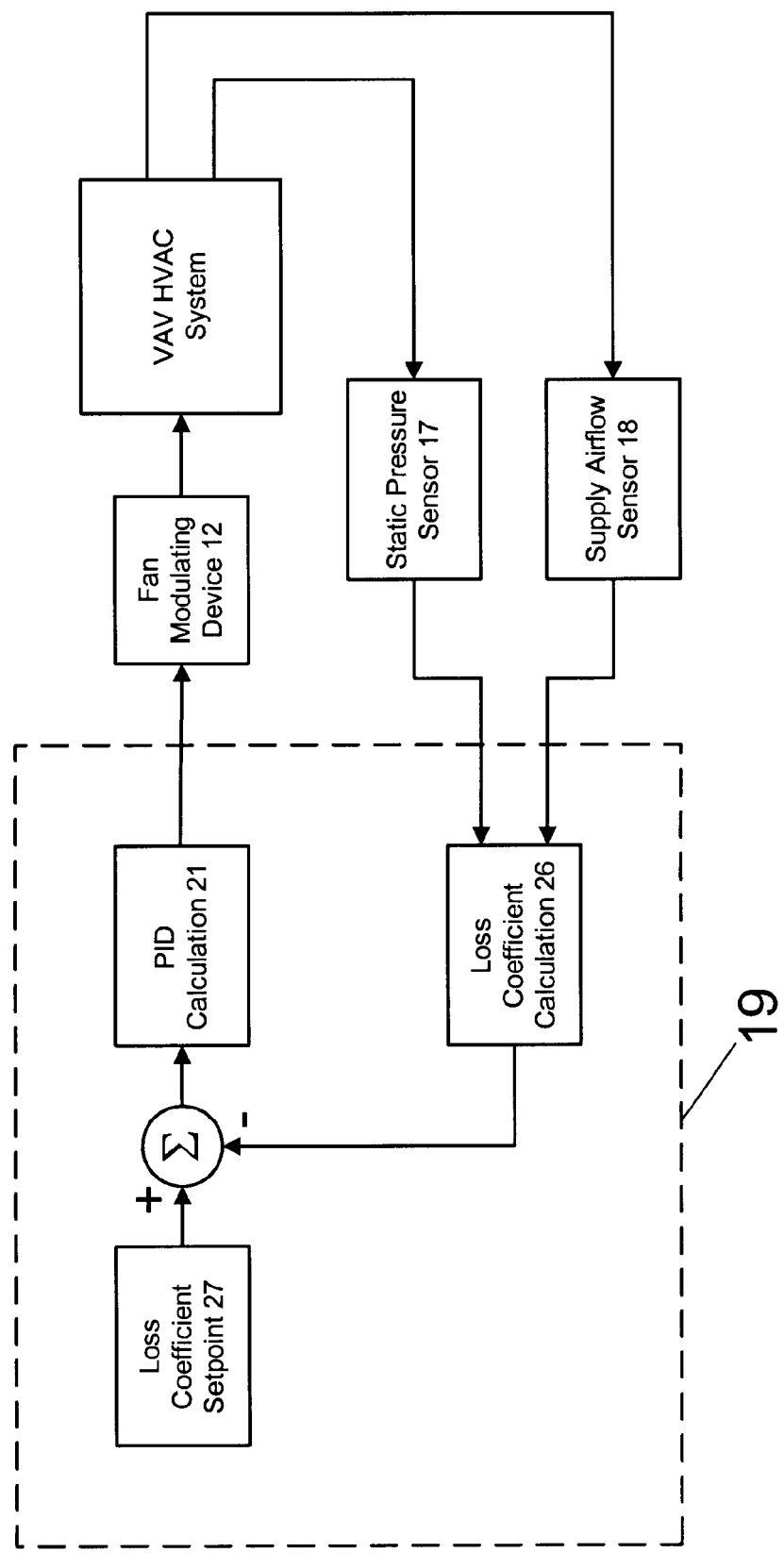
FIG. 5 shows a block diagram of a strategy that controls the pressure loss coefficient of the supply air system.

An alternative embodiment is shown in FIG. 4 and FIG. 5.

FIG. 4 shows a state transition diagram of an alternative embodiment for controlling the supply fan 11. In the alternative embodiment, the system has two modes: loss coefficient control mode 24 and constant pressure control mode 25. The loss coefficient control mode 24 has a loss coefficient calculator 26 which computes a loss coefficient, denoted as K, that is a function of the output of the static pressure sensor 17 and the output of the airflow sensor 18 as follows:

$$K = \frac{P}{Q^n + C} \quad (A)$$

where P denotes the output of the static pressure sensor 17, Q denotes the output of the airflow sensor 18, n is an exponent preferably between 1.0 and 2.0, and C is a constant used to ensure that the supply fan 11 will develop pressure and flow when the system is first turned on.

FIG. 5 shows a block diagram of the loss coefficient mode. The output of the static pressure sensor and the output of the airflow sensor are inputs to the loss coefficient calculation 26. The loss coefficient calculation is defined by Equation A. The calculated loss coefficient is compared to a loss coefficient setpoint 27. The difference between the loss coefficient setpoint 27 and the calculated loss coefficient is input to the PID calculator 21. The output of the PID calculator 21 is the input to the fan modulating device 12.

Operation of an Alternative Embodiment

In operation, the alternative embodiment also reduces the static pressure below the design static pressure when the airflow rate is lower than the design airflow rate. When the system is first turned on, the airflow is zero and the calculated loss coefficient of the alternative embodiment is equal to zero. The PID calculator 21 causes the fan modulation device 2 to accelerate the supply fan 11, which increases the static pressure and the airflow. Eventually the terminal unit controllers 16 adjust the terminal dampers 20 to achieve desired terminal unit airflow rates. When this happens, the airflow rate stabilizes, which causes the denominator of Equation A to become nearly constant and the controller to behave like a static pressure regulator, and stabilize the static pressure. If one or more terminal unit controller 16 causes the airflow rate to decrease, then the calculated loss coefficient will increase, and the controller will respond by decreasing the pressure to return the calculated loss coefficient back to the loss coefficient setpoint. If one or more terminal unit controller 16 causes the airflow rate to increase, then the calculated loss coefficient will decrease, and the controller will respond by increasing the pressure to return the calculated loss coefficient back to the loss coefficient setpoint. If the airflow rate increases beyond a design airflow rate while in loss coefficient control mode 24, then the controller will switch to constant pressure control mode 25. In loss coefficient control mode 25 the pressure will be maintained near the design static pressure regardless of the how much higher the airflow rate increases beyond the design airflow rate. When the airflow rate decreases below the design airflow rate while in constant pressure control mode 25, the controller will switch back to loss coefficient control mode 24.

Conclusion, Ramifications, and Scope

Accordingly, the reader will see that the supply fan control system of this invention has a number of advantages including the following:

(a) It is not necessary to measure the position of terminal dampers.

(b) Since it is not necessary to measure terminal damper position, the invention is not sensitive to terminal unit failure, terminal unit undersizing, or communication system failure (c) The control system is easy to tune. It only requires the tuning of the PID calculator used to control static pressure.

This disclosure is provided to reveal preferred embodiments of the invention and a best mode for practicing the invention. Having thus described the invention in this way, it should be apparent that various different modifications can be made to the preferred embodiment without departing from the scope and spirit of this disclosure. For instance, the invention can be adapted to operate a variable-flow liquid handling system. Also, the airflow rate could be inferred by adding the readings from sensors in a plurality of ducts upstream of the supply fan or from sensors in a plurality of ducts downstream of the supply fan.

Thus the scope of the invention should be determined by the appended claims and their legal equivalents, rather than by the examples given.

I claim:

1. An apparatus for controlling a supply fan of a variable-air-volume heating, ventilating, and air-conditioning systems comprising in combination:

said supply fan;

a fan modulating device coupled to said supply fan;

a static pressure sensor;

an airflow sensor;

a supply fan controller coupled to said static pressure sensor, said airflow sensor, and said fan modulating device, said supply fan controller configured to reduce static pressure below a design static pressure when said airflow sensor indicates that airflow rate is less than a design airflow rate.

2. The apparatus of claim 1 wherein said fan modulating device is a variable frequency drive.

3. The apparatus of claim 1 wherein said fan modulating device is a variable pitch device.

4. The apparatus of claim 1 wherein said airflow sensor is located upstream of said supply fan.

5. The apparatus of claim 1 wherein said airflow sensor is located downstream of said supply fan.

6. The apparatus of claim 1 wherein said supply fan controller is an electronic device comprising in combination a memory and a microprocessor.

7. A method for controlling a supply fan of a variable-air-volume heating, ventilating, and air-conditioning system, the method including the steps of:

measuring static pressure downstream of said fan;

measuring airflow rate through said fan;

calculating a command for a fan modulating device based on said static pressure and said supply airflow rate so that said static pressure will be reduced below a design static pressure when said airflow rate is reduced below a design airflow rate.

8. The method of claim 7 wherein said calculating step includes a pressure setpoint calculating step, said pressure setpoint calculating step having as input said supply airflow rate.

9. The method of claim 8 wherein said pressure setpoint calculating step uses a lookup table.

10. The method of claim 8 wherein said pressure setpoint calculating step uses a polynomial function.

11. The method of claim 8 wherein said pressure setpoint calculating step uses a linear function.

12. The method of claim 7 wherein said calculating step includes switching between two operating modes, a loss coefficient control mode and a constant pressure control mode.

13. The method of claim 12 wherein said switching from said loss coefficient control mode to said constant pressure control mode is triggered by said airflow rate exceeding said design airflow rate.

14. The method of claim 12 wherein said switching from said constant pressure control mode to said loss coefficient control mode is triggered by said airflow rate dropping below said design airflow rate.

15. The method of claim 7 wherein said calculating step includes the step of calculating a loss coefficient as said static pressure indicated by a static pressure sensor divided by the sum of a constant and said airflow rate indicated by an airflow sensor raised to an exponent.

16. The method of claim 15 wherein said exponent is less than or equal to 2.0 and greater than or equal to 1.0.

* * * * *